United States Patent
Thomsen et al.

(10) Patent No.: US 10,063,084 B2
(45) Date of Patent: Aug. 28, 2018

(54) APPARATUS FOR DIGITAL BATTERY CHARGER AND ASSOCIATED METHODS

(71) Applicant: Silicon Laboratories Inc., Austin, TX (US)

(72) Inventors: Axel Thomsen, Austin, TX (US); Dazhi Wei, Austin, TX (US); Steffen Skaug, Oslo (NO); Praveen Kallam, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 289 days.

(21) Appl. No.: 14/979,514

(22) Filed: Dec. 28, 2015

(65) Prior Publication Data

US 2017/0187218 A1    Jun. 29, 2017

(51) Int. Cl.
    *H02J 7/00*    (2006.01)

(52) U.S. Cl.
    CPC .......... *H02J 7/0083* (2013.01); *H02J 7/0052* (2013.01); *H02J 2007/0059* (2013.01)

(58) Field of Classification Search
    CPC ...... H02J 7/0047; H02J 7/0052; H02J 7/0077; H02J 7/0083; H02J 7/045; H02J 7/047; H02J 2007/0059
    See application file for complete search history.

(56) References Cited

U.S. PATENT DOCUMENTS

| | | | |
|---|---|---|---|
| 7,271,568 B2 | 9/2007 | Purdy et al. | |
| 7,656,127 B1 * | 2/2010 | Shutt | H01M 10/425 320/134 |
| 9,059,590 B2 | 6/2015 | Cassidy | |
| 9,063,559 B2 | 6/2015 | Ivanov | |
| 9,083,199 B2 | 7/2015 | Do Valle | |
| 9,093,855 B2 | 7/2015 | Zhu | |
| 9,178,407 B2 | 11/2015 | Gurlahosur | |
| 2001/0043050 A1 | 11/2001 | Fisher, Jr. | |
| 2005/0062457 A1 | 3/2005 | Galant et al. | |
| 2009/0009137 A1 | 1/2009 | Zhang | |
| 2011/0279079 A1 * | 11/2011 | Do Valle | H02J 7/0073 320/107 |
| 2012/0194141 A1 | 8/2012 | Shi et al. | |
| 2014/0125272 A1 | 5/2014 | Weissinger | |
| 2015/0015204 A1 | 1/2015 | Sorias et al. | |
| 2015/0069951 A1 | 3/2015 | Wang et al. | |
| 2015/0102765 A1 | 4/2015 | Lee et al. | |

(Continued)

OTHER PUBLICATIONS

U.S. Appl. No. 14/979,516, filed Dec. 2015, Wei et al.

(Continued)

*Primary Examiner* — Drew A Dunn
*Assistant Examiner* — Sailesh Thapa
(74) *Attorney, Agent, or Firm* — Law Offices of Maximilian R. Peterson (57) ABSTRACT

An apparatus includes a digital battery charger. The digital battery charger includes an analog-to-digital converter (ADC) to convert a terminal voltage of a battery to a first digital signal. The digital battery charger further includes a digital controller coupled to the ADC to receive the first digital signal and provide a set of control signals. The digital battery charger further includes a current digital-to-analog converter (IDAC) coupled to the digital controller to receive the set of control signals and to provide a battery charging current signal.

20 Claims, 8 Drawing Sheets

(56) References Cited

U.S. PATENT DOCUMENTS

2015/0340897 A1    11/2015   Uan-Zo-Li et al.
2016/0006272 A1*   1/2016   Greening .............. H02J 7/0008
                                                                             320/162

OTHER PUBLICATIONS

DS1340, I2C RTC with Trickle Charger, Apr. 2013, 17 pgs.
NiCd/NiMH Battery Fast-Charge Controllers, Apr. 2002, 17 pgs.
Sealed Lead-Acid Battery Charger, May 2005, 18 pgs.
Office communication in U.S. Appl. No. 14/979,516; dated Nov. 1, 2017 (16 pgs.).
Office communication in U.S. Appl. No. 14/979,516; dated Jan. 30, 2018 (9 pgs.).

* cited by examiner

APPARATUS FOR DIGITAL BATTERY CHARGER AND ASSOCIATED METHODS

TECHNICAL FIELD

The disclosure relates generally to battery charging and, more particularly, to apparatus for digital battery charging, and associated methods.

BACKGROUND

Batteries have long been used as a means of storing electrical energy. The ability to store electrical energy has provided a way of powering electrical and electronic circuitry in situations where access to the utility grid does not exist or is limited. Furthermore, in the case of mobile electrical or electronic devices, the very design and nature of the device assumes operation without a connection to the utility grid. The market penetration of mobile electronic devices has increased the use of batteries.

A wide variety of devices, such as tablets, laptops, notebooks, cellular phones, and the like have been adopted by the general population in increasing numbers. Use of batteries to power the device has allowed the creation and proliferation new technologies. In order to enable operation when not connected to the utility grid, batteries are charged, typically from the utility grid or another source of power, such as solar panels, wind generators, and the like.

The description in this section and any corresponding figure(s) are included as background information materials. The materials in this section should not be considered as an admission that such materials constitute prior art to the present patent application.

SUMMARY

A variety of digital battery charging apparatus and associated methods are contemplated. According to one exemplary embodiment, an apparatus includes a digital battery charger. The digital battery charger includes an analog-to-digital converter (ADC) to convert a terminal voltage of a battery to a first digital signal. The digital battery charger further includes a digital controller coupled to the ADC to receive the first digital signal and provide a set of control signals. The digital battery charger further includes a current digital-to-analog converter (IDAC) coupled to the digital controller to receive the set of control signals and to provide a battery charging current signal.

According to another exemplary embodiment, an apparatus includes a digital battery charger. The digital battery charger includes a first ADC to convert a terminal voltage of a battery to a first digital signal, and a second ADC to convert a supply current signal to a second digital signal. The digital battery charger also includes a digital controller coupled in a feedback loop to receive the first and second digital signals and provide a set of control signals. The digital battery charger further includes a first current digital-to-analog converter (IDAC) coupled to the digital controller to receive the set of control signals and to provide a battery charging current signal; and a second IDAC to convert battery parameters to a reference signal provided to the first IDAC.

According to another exemplary embodiment, a method of charging a battery using a battery charger employing a digital control loop includes converting, by using an ADC, a terminal voltage of a battery to a first digital signal; and generating, using a digital controller coupled to receive the first digital signal, a set of control signals. The method further includes receiving the set of control signals in a first current IDAC; and generating, using the first IDAC, a battery charging current signal.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to digital power converter or controllers, such as battery chargers. More specifically, the disclosed concepts provide apparatus and methods for digital battery chargers. In exemplary embodiments, digital battery chargers use a digital control scheme together with one or more IDACs to provide a variety of benefits, such as the ability to accommodate a variety of charging processes, patterns, stages, phases, etc. (generally, modes), automatically changing or making a transition from one charging mode to another as a function of time and/or battery or system conditions or parameters, etc., as described below in detail.

Figure 1:
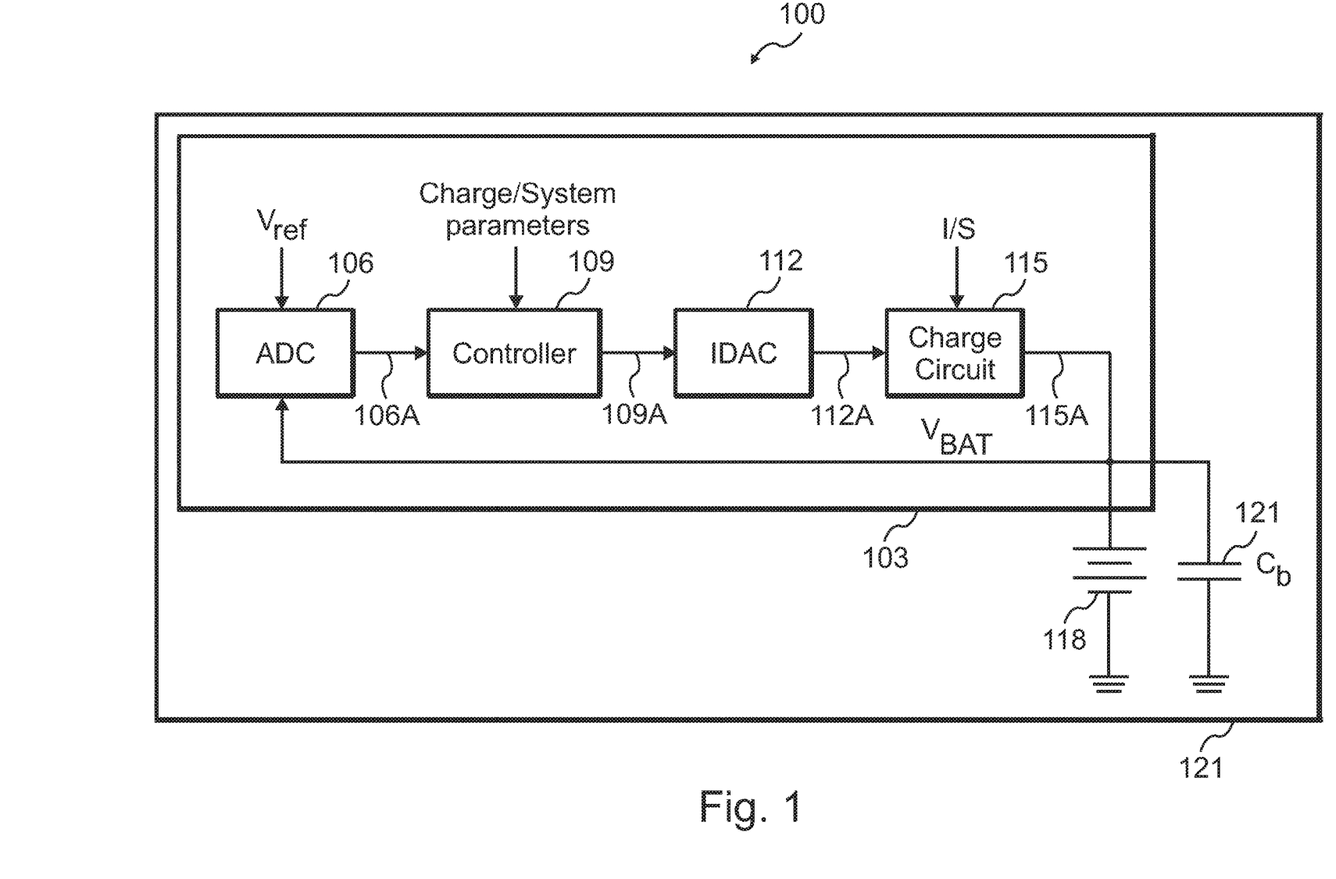
FIG. 1 illustrates a circuit arrangement according to an exemplary embodiment that includes a digital battery charger.

FIG. 1 illustrates a circuit arrangement 100 according to an exemplary embodiment that includes a digital battery charger. Circuit arrangement 100 includes an apparatus 121, which includes a digital battery charger 103.

In exemplary embodiments, apparatus 121 may take a variety of forms. For example, in some embodiments, apparatus 121 may constitute a system, a subsystem, or a circuit block that is part of a larger system, subsystem, etc. Apparatus 121 may include a variety of other circuitry, such as signal processing circuitry, digital processing circuitry, computing/processing circuitry, power converters, etc., as persons of ordinary skill in the art will understand.

As another example, in some embodiments, apparatus 121 may constitute an integrated circuit (IC). In some embodiments, the IC may include digital circuitry, such as processing core(s), general logic circuits, etc. In some embodiments, the IC may include mixed-signal circuitry, including analog circuitry and digital circuitry.

In some embodiments, apparatus 121 may include power management circuitry, such as a power management unit (PMU). The PMU may include, or operate with, a digital battery charger (e.g., the PMU and the digital battery charger may be integrated together within an IC). The PMU may also include circuitry to supervise, control, or perform various power conversion and control or management tasks. For example, the PMU may include power converters, control circuitry for power converters, sensors, control circuits, and the like, as persons of ordinary skill in the art will understand.

Referring again to FIG. 1, digital battery charger 103 includes analog-to-digital converter (ADC) 106, digital controller 109, IDAC 112, and charge circuit 115. ADC 106 receives an analog voltage (the voltage between the two terminals) of battery 118. ADC 106 converts the analog voltage to a digital signal 106A (a digital battery voltage signal, or a digital signal derived from or representative of the terminal voltage of battery 118), which it provides to digital controller 109.

In exemplary embodiments, ADC 106 may take a variety of forms or contain a variety of circuitry, as persons of ordinary skill in the art will understand. In some embodiments, ADC 106 may constitute a sigma-delta ADC. ADC 106 may also use a reference signal (not shown) to perform the signal conversion described above.

Digital controller 109 uses digital signal 106A to generate digital signal 109A. In addition to digital signal 106A, digital controller 109 uses other information or parameters, such as charge information (e.g., the type of charging or charge profile desired, the number and type of stages of charging, e.g., constant voltage, constant current, pre-charge, float charge, etc.).

Digital controller 109 may also use other information or parameters, such as system parameters, for example, the level of current available for charging the battery, the voltage level or supply available for charging the battery, temperature of one or more circuits (such as, or including, the temperature of cell(s) in battery 118), etc. Using the temperature levels alone or in combination with other information (battery terminal voltage, battery charge current, etc.) may be used to implement battery and/or charger protection schemes. In other words, a rise or fall in temperature of one or more components (e.g., one or more devices in charge circuit 115, battery 118, etc.) beyond a given or desired threshold may be used (optionally with voltage and/or current information, described above) to reduce the battery charging current and/or voltage or to stop charging altogether.

Digital signal 109A drives an input of IDAC 112. In response, IDAC 112 generates an analog signal or analog output signal 112A (a current signal, in exemplary embodiments), which drives an input of charge circuit 115. In exemplary embodiments, IDAC 112 may take a variety of forms or contain a variety of circuitry. For example, in some embodiments, IDAC 112 may use a variable resistor and circuitry for generating currents having a desired ratio to one or more other currents, as described below in detail.

In response to analog signal 112A, charge circuit 115 generates a charge signal 115A. Generally, charge signal 115 is derived from a supply voltage, labeled $V_s$. The supply voltage may take a variety of forms, such as another battery, a DC source, an AC source (e.g., the mains), and the like. Furthermore, in some embodiments, rather than using a supply voltage, charge circuit 115 may receive and use a source of current to charge battery 118, as desired.

In order to provide charge signal 115A, charge circuit may include a variety of circuitry. The choice of circuitry depends on design and performance specifications, cost, whether the circuit is integrated, type of battery, current and/or voltage levels involved (e.g., the differential between the supply voltage and the voltage level(s) used to charge battery 118).

The circuitry in charge circuit 115 may include a variety of devices. Examples include transistors, such as metal oxide semiconductor field effect transistors (MOSFETs), diodes, resistors, current mirrors, reference source (e.g., current source, voltage source), and the like. The choice of the type and number of devices depends on various factors, such as the type and topology of charge circuit 115 used in a particular implementation.

Referring again to FIG. 1, charge signal 115A is used to charge battery 118. In exemplary embodiments, charge signal 115A may have a variety of forms to accommodate desired or specified battery charging modes, as described below in detail.

In some embodiments, such as the embodiment shown in FIG. 1, a bypass capacitor 121 (labeled $C_b$) may be coupled across battery 118. Bypass capacitor 121, as the name suggests, provides bypass current in the situations where relatively large current changes are encountered, and also filters high frequency ripple voltages across battery 118. In some embodiments, bypass capacitor may be external to digital battery charger 103 (e.g., as shown in FIG. 1). In some embodiments, however, depending on factors such as the size of capacitor 121, available technology, etc., capacitor 103 may be included with or integrated with digital battery charger 103.

One aspect of the disclosure relates to flexible control of digital battery charger 103. In some embodiments, digital battery charger 103 (e.g., through digital controller 109) may take into account one or more conditions or parameters of the system or subsystem in which it is includes or within or with which it operates. For example, as noted above, in some embodiments, temperatures of one or more circuit or system blocks, components, circuits, etc., may be taken into account.

For instance, if the temperature of one or more cells of battery 118 rises or falls beyond or below, respectively, a certain or given level (e.g., a threshold), digital controller 109 may cause a reduction in the level of voltage and/or current used to charge battery 118 (or cease or stop or terminate the charging of battery 118). As another example, depending on factors such as the temperature of one or more devices in charge circuit 115 (e.g., a transistor used to provide charging current or voltage to battery 118), digital controller 109 may cause a reduction in the level of voltage and/or current used to charge battery 118 (or cease or stop or terminate the charging of battery 118).

In addition to, or instead of, using temperature to control the charging process, other variables or parameters may be used. For example, in some embodiments, digital controller 109 may cause a reduction in the level of voltage and/or current used to charge battery 118 (or cease or stop or terminate the charging of battery 118) if the supply voltage exceeds or falls below certain levels, respectively (e.g., thresholds).

As another example, in some embodiments, digital controller 109 may cause a reduction in the level of voltage and/or current used to charge battery 118 (or cease or stop or terminate the charging of battery 118) if the current drawn from (or available from) supply voltage and/or battery 118 exceeds a certain level (e.g., a threshold). Other types of control schemes, based on one or more other conditions, parameters, etc. in digital battery charger 103 (or other blocks, circuits, subsystems, etc.) may be used to provide flexible techniques for charging battery 118 while responding to various conditions, such as conditions that impact the safety or longevity of circuit components or elements, battery 118, the supply source, etc.

In some embodiments, battery 118 may include an intelligent or "smart" controller, such as a microcontroller unit (MCU), or other device, circuit. In those situations, digital controller 109 may communicate with such a controller via a communication link (not shown) to exchange one or more status and/or control signals. In this manner, digital controller 109 may coordinate charging of battery 118 with such a controller.

Furthermore, as noted above, apparatus 121 may include other circuitry, blocks, subsystems, systems, etc. that couple to and communicate or function with digital battery charger 103. For example, apparatus 121 may include an MCU (not shown) that communicates with digital battery charger 103 over a link (not shown), such as a coupling mechanism (wires, traces, etc.), bus, etc.

In some embodiments, the MCU may be integrated together with digital battery charger 103 in an IC. In some embodiments, the MCU may be integrated in a separate IC than digital battery charger 103. In such a situation, the MCU and digital battery charger 103 may communicate via a bus or traces on a printed circuit board (PCB) with digital battery charger 103.

In some embodiments, the MCU may be integrated in one semiconductor die, whereas digital battery charger 103 is integrated in another semiconductor die. The two die may be included within a multi-chip module (MCM). The die may be linked via a bus or other coupling mechanism.

In embodiments where apparatus 121 includes an MCU (not shown), the MCU may coordinate its operations with the operations of digital battery charger 103. For instance, the MCU may control operations of digital battery charger 103, such as provide battery, charging, and/or system parameters, variables, and/or other information to digital battery charger 103.

Furthermore, digital battery charger 103 may communicate information to the MCU. For example, digital battery charger 103 may provide to the MCU status, information, data, etc. (e.g., the state of the battery charging process, the battery voltage, charging mode (constant current, constant voltage, etc.), charging voltage or current).

In the embodiment shown in FIG. 1, digital battery charger 103 uses a negative feedback loop to charge the battery. Specifically, a negative feedback loop that includes IDAC 112 uses information provided from ADC 106 (digital signal 106A) in order to provide analog signal 112A to charge circuit 115. ADC 106 derives digital signal 106A from the terminal voltage of battery 118. Thus, the terminal voltage of battery 118 in part determines the nature or characteristics of analog signal 112A and, thus, of the type of charge signal 115A used to charge battery 118.

In addition to (or instead of, in some situations) using the terminal voltage of battery 118, in some embodiments, the charge current (i.e., the current provided by charge circuit 115 to battery 118, for instance through charge signal 115A) may be used in the negative feedback mechanism of digital battery charger 103.

Figure 2:
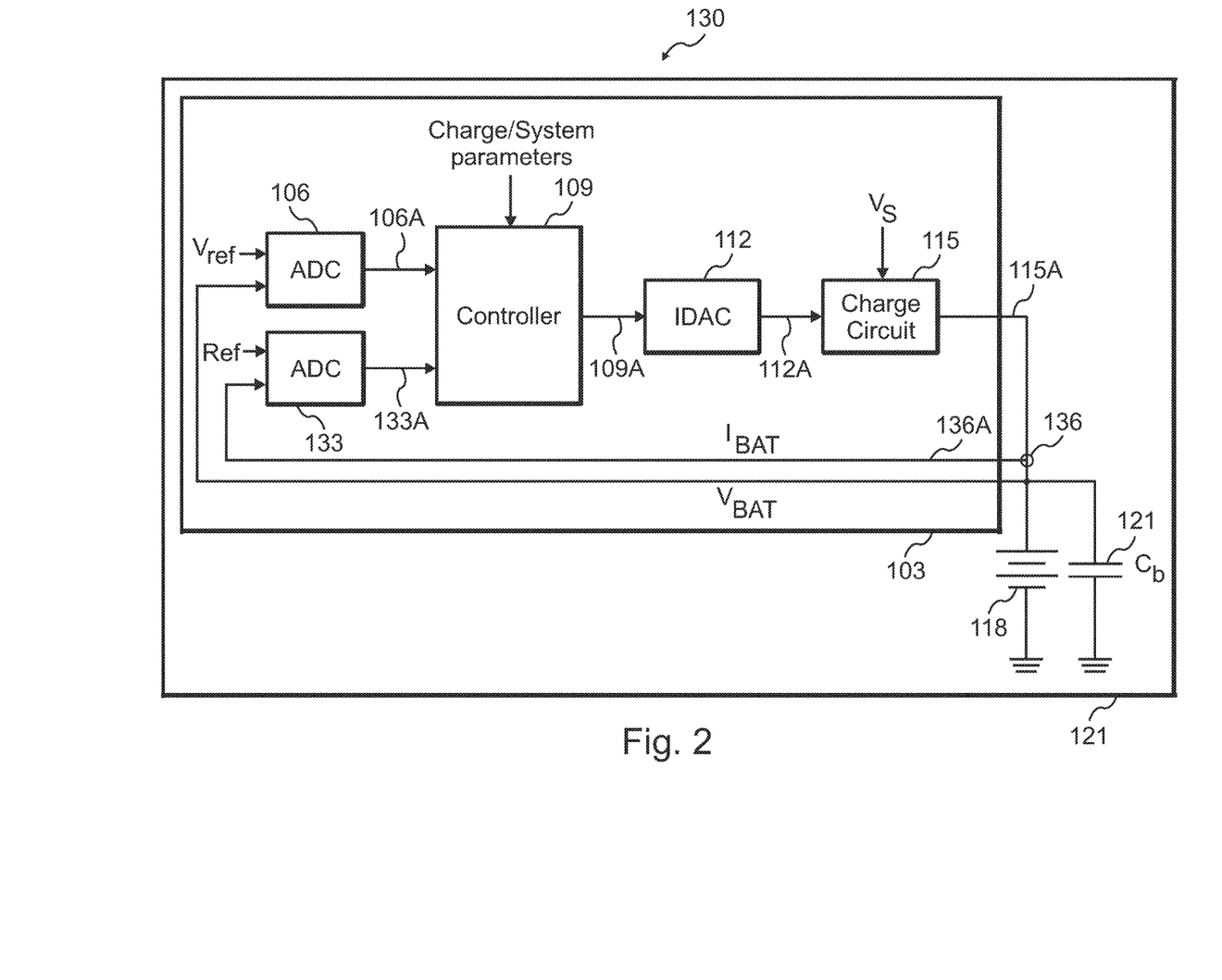
FIG. 2 depicts a circuit arrangement according to another exemplary embodiment that includes a digital battery charger.

FIG. 2 depicts a circuit arrangement 130 according to another exemplary embodiment that uses a current signal as part of a negative feedback mechanism. More specifically, digital battery charger 103 in circuit arrangement 130 receives a current signal 136A from current sensor 136. Current signal 136A is derived from or represents the current (typically, charge current 115A) flowing through battery 118.

ADC 133 converts current signal 136A, typically an analog signal, to a digital signal 133A. ADC 133 provides digital signal 133A to digital controller 109. Digital signal 133A, which provides a measure of or is derived from the current flowing through battery 118, allows digital controller 109 to implement a negative feedback loop that uses not only the terminal voltage of battery 118, but also the current flowing through battery 118. In some situations, using both the terminal voltage of battery 118, but also the current flowing through battery 118 in a feedback loop, allows more flexibility, easier control, more comprehensive control, etc.

In exemplary embodiments, current sensor 136 may have a variety of forms or may use a variety of circuitry or devices. For example, current sensor 136 may constitute a resistor coupled in series with battery 118. The voltage across the resistor provides a measure of the current flowing through the resistor, hence, through battery 118.

As another example, current sensor 136 may constitute or use a Hall effect sensor, for instance, coupled in a feedback loop with an amplifier. As another example, current sensor 136 may constitute or use a sense field effect transistor (FET).

As yet another example, in some embodiments, current sensor 136 may be included in the battery pack that houses or includes battery 118. In such a situation, the battery pack provides current signal 136A to ADC 133. In some embodiments, the battery pack may provide a digital signal that is representative of the current flowing through battery 118 (i.e., similar to digital signal 133A, described above). In such a situation, ADC 133 may be omitted, as persons of ordinary skill in the art will understand.

As noted above, charge signal 115A, provided by charge circuit 115, may have a variety of forms to accommodate desired or specified battery charging modes. In other words, the quality (type) and quantity (level) of charge signal 115A may be varied by digital controller 109 in order to accommodate various types of battery 118, different system conditions, and/or user input (e.g., desired to switch charging modes), etc. An example of some of the charging modes that digital battery charger 103 can accommodate are described below in connection with FIG. 3.

Figure 3:
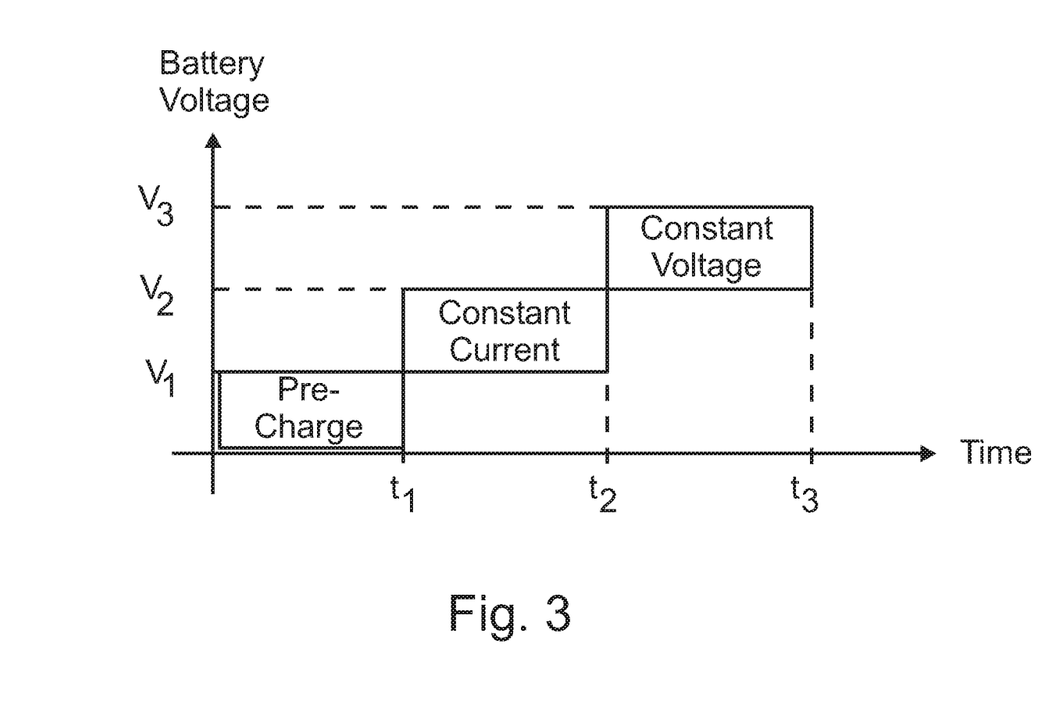
FIG. 3 shows various stages of battery charging using a digital battery charger according to an exemplary embodiment.

More specifically, FIG. 3 shows an example according to an exemplary embodiment of the various stages or modes of charging a battery 118, using a digital battery charger 103. More specifically, the figure shows the battery charging modes as a function of time.

In the example of FIG. 3, battery charging battery charging begins with a pre-charge mode. In this mode, digital battery charger 103 provides a specified or desired amount of current or voltage (depending on factors such as the type of battery, battery capacity, battery chemistry, etc.) to battery 118.

At time $t_1$, the terminal voltage of the battery reaches the voltage shown as $V_1$. At that time, digital battery charger 103 leaves the pre-charge mode, and enters a constant current mode. During this mode, digital battery charger 103 provides a constant (or nearly constant, in a real-world, physical implementation) current to battery 118 as a function of time.

At the conclusion of the constant current mode, the terminal voltage of battery 118 reaches voltage $V_2$ at time $t_2$.

At that time, digital battery charger 103 leaves the constant current mode and switches to or enters the constant voltage mode of operation. During this mode, digital battery charger 103 provides a constant (or nearly constant, in a real-world, physical implementation) voltage $V_3$ to battery 118 as a function of time. The value of voltage $V_3$ can be higher or equal to the value of voltage $V_2$, as desired.

In the example shown, digital battery charger 103 terminates charging at time $t_3$. Digital battery charger 103 may terminate charging in response to an occurrence of an event, such as the terminal voltage of battery 118 reaching a desired or target or threshold value, shown as $V_3$, or the current through battery 118 falling below a desired or target or threshold value, at time $t_3$. Thereafter, digital battery charger 103 may provide a float charge (not shown in FIG. 3) to battery 118, as desired.

Figure 4:
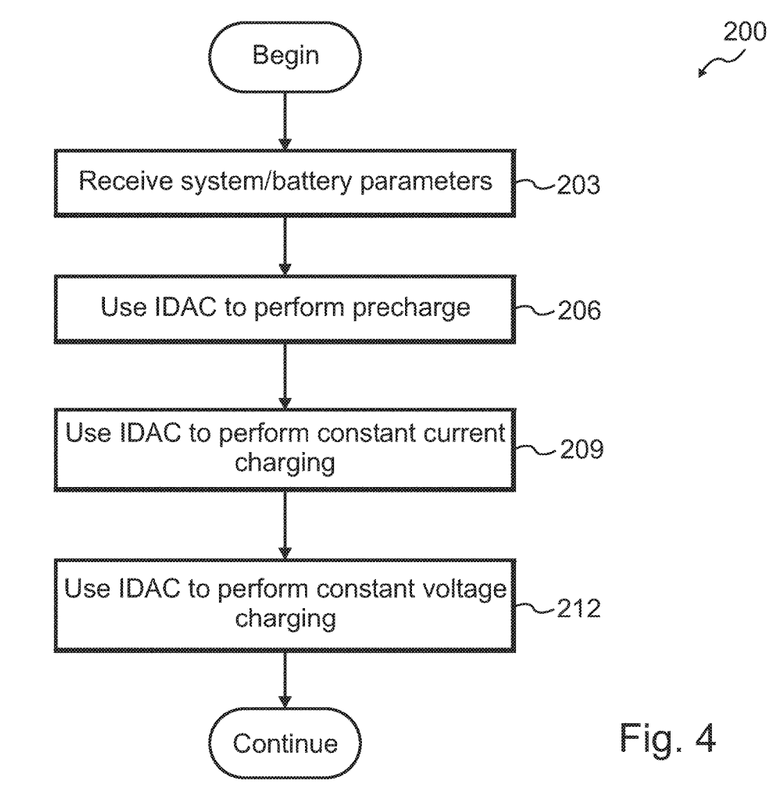
FIG. 4 depicts a flow diagram for a process of charging a battery according to an exemplary embodiment.

FIG. 4 depicts a flow diagram 200 for a process of charging battery 118. The example shown in FIG. 4 corresponds to the battery charging stages or modes shown in FIG. 3. Other charging processes are contemplated, and can be accommodated in exemplary embodiments.

Referring again to FIG. 4, at 203, digital battery charger 103 receives battery and/or system conditions or parameters, information, etc., as described above. In exemplary embodiments, the parameters include information about the battery charging process, such as the various charging modes, conditions for each mode (e.g., start conditions or time, stop conditions, such as threshold voltages, etc.), and/or the order of the charging modes.

In the exemplary embodiment shown in FIG. 4, the charging process includes three modes: pre-charge, constant current, and constant voltage. Other orders, types, and numbers of charging modes may also be used, as described above.

At 206, the IDAC in digital battery charger 103, e.g., IDAC 112, used to perform the pre-charge mode or stage. Subsequently, a transition from the pre-charge mode is made, as described above. Thus, at 209, the IDAC is used to perform a constant current charging mode.

Subsequently, a transition from the constant current mode is made, as described above. More specifically, at 212, the IDAC is used to perform a constant voltage charging mode. The constant voltage charging mode may be terminated based on one or more conditions. At that point, battery 118 is charged. As noted above, a float charge mode may subsequently be used, as desired.

In exemplary embodiments, transitions between charging modes or stages may be done either automatically (e.g., depending on battery chemistry, characteristics, type, etc.), depending on user input (e.g., the duration and/or order of various charging modes or stages), or a combination of the two, as desired. In other words, in some embodiments, digital controller 109 may use the system and/or battery parameters or information to make transitions between various charging modes, as described above.

In some embodiments, the user might change the charging modes, the durations of various modes, etc., as desired. In such a scenario, digital controller 109 changes the battery charging process or profile accordingly.

Note that the particular battery charging process or profile shown in FIGS. 3 and 4 and described above constitutes merely an example. Other battery charging processes, which may include one or more of different types of battery charging modes, are contemplated, and can be accommodated by digital battery charger 103.

For example, in some embodiments, charge signal 115A may support one or more pre-charge modes for charging battery 118. As another example, in some embodiments, charge signal 115A may support one or more constant current modes for charging battery 118. As another example, in some embodiments, charge signal 115A may support one or more constant voltage modes for charging battery 118. As another example, in some embodiments, charge signal 115A may support one or more float-charging modes for charging battery 118.

In some embodiments, digital battery charger 103 supports combining one or more of the battery charging modes described above with one or more battery charging modes, as desired. In this manner, a wide variety of battery charging processes or profiles may be supported, depending on factors such as design and performance specifications, the type of battery 118, the level of voltage and/or current available for charging battery 118, cost, complexity, etc.

For example, in some embodiments, a battery charging process may include a pre-charge mode, followed by a constant voltage mode, followed by a constant current mode. As another example, in some embodiments, a battery charging process may include a pre-charge mode, followed by a constant current mode, followed by a constant voltage mode.

As another example, in some embodiments, a battery charging process may include a constant current mode followed by a constant voltage mode. As yet another example, in some embodiments, a battery charging process may include a constant voltage mode followed by a constant current mode. Furthermore, a float-charge mode may be used to complete the charging process in any of the examples discussed above, as persons of ordinary skill in the art will understand.

Another aspect of the disclosure relates to the design and/or topology of various blocks or circuits in digital battery charger 103. More specifically, various blocks or circuits in digital battery charger 103, such as the embodiments shown in FIGS. 1-2, may be implemented in a variety of ways. Generally speaking, a number of techniques may be used to implement digital signal processing blocks, depending on factors such as design and performance specifications, available technology or process, complexity, cost, etc.

Figure 5:
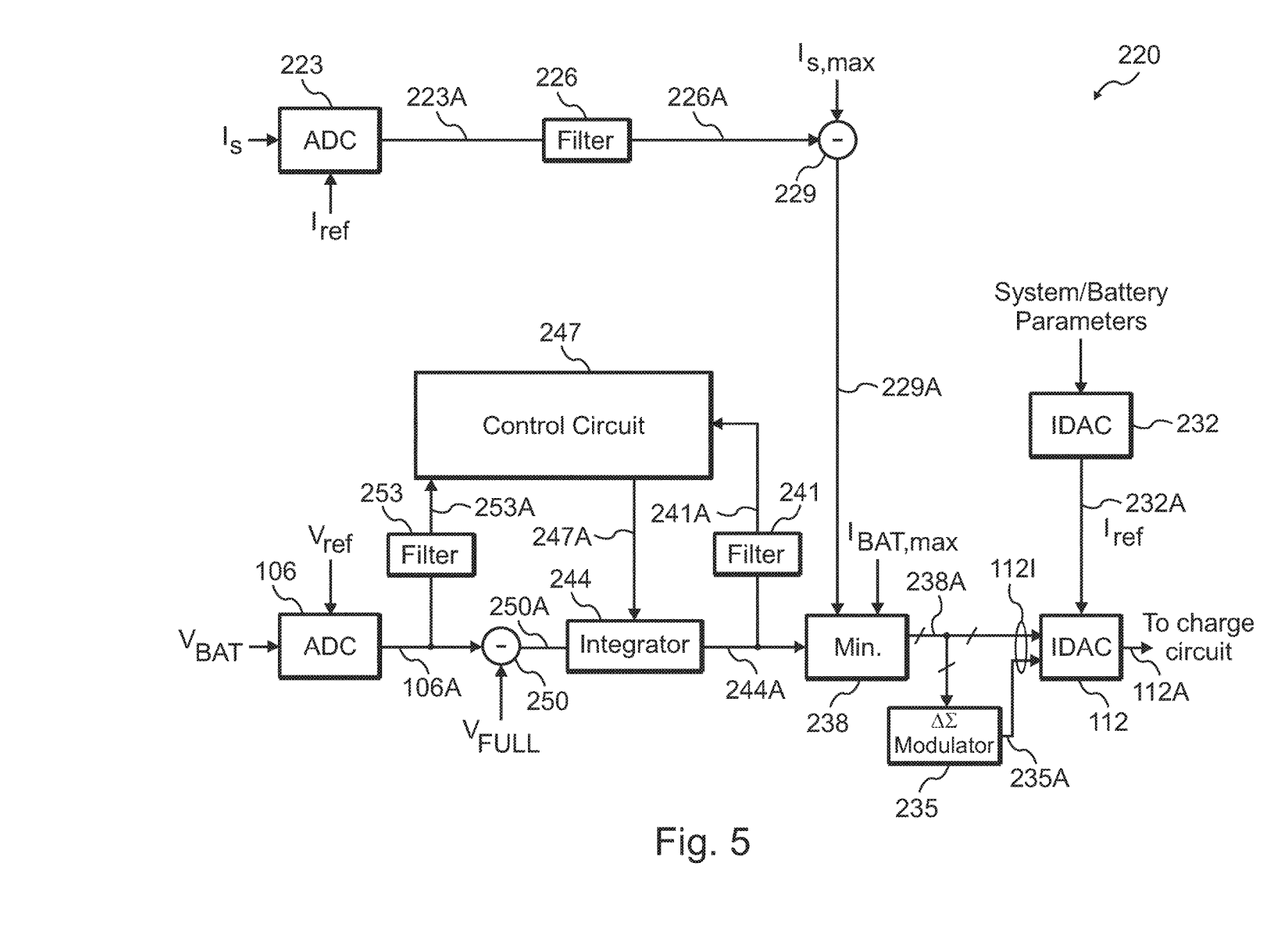
FIG. 5 illustrates a circuit arrangement for control and signal processing according to an exemplary embodiment.
Figure 6:
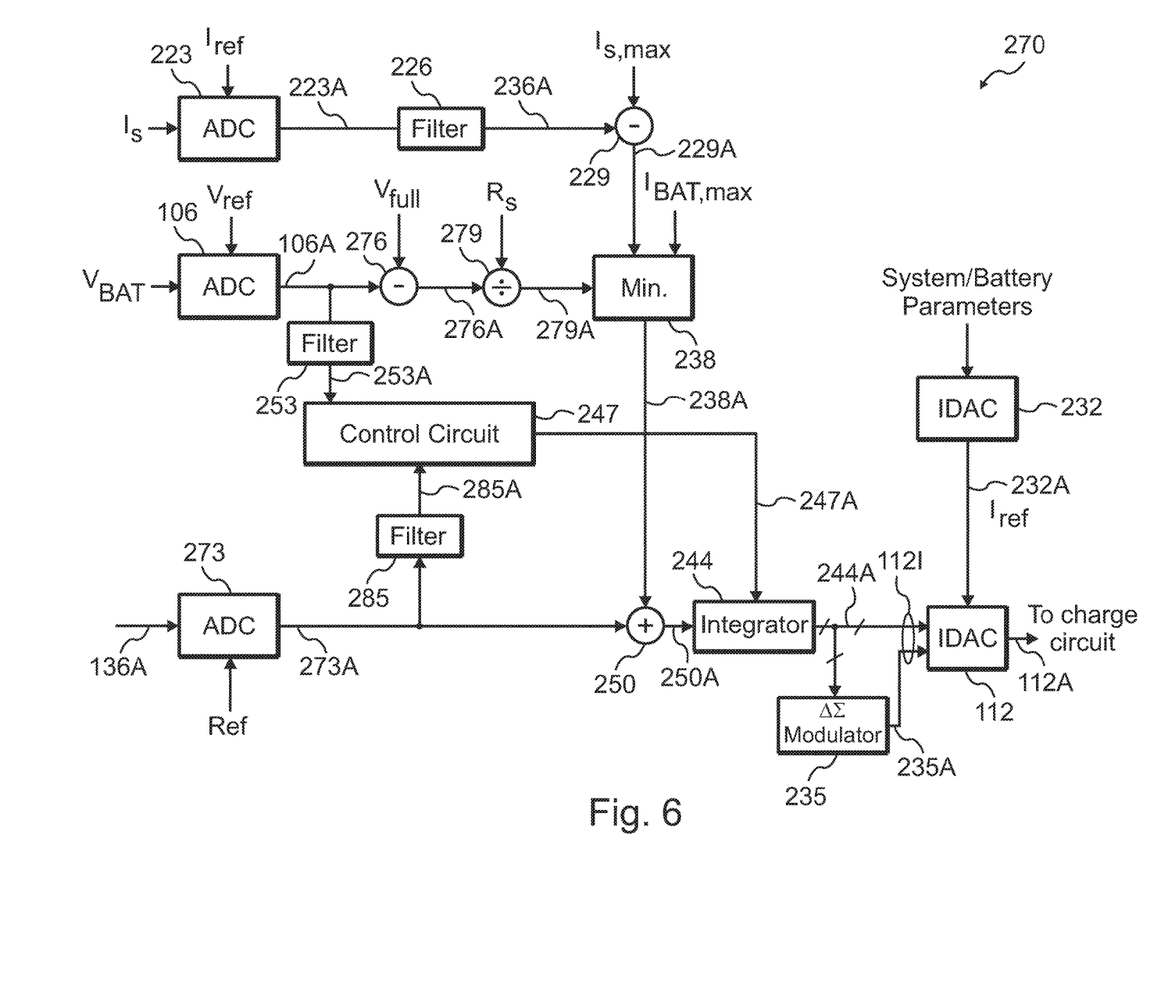
FIG. 6 depicts a circuit arrangement for control and signal processing according to another exemplary embodiment.

FIGS. 5-6 illustrate block diagrams of digital battery charger 103 according to exemplary embodiments. Generally, the embodiments in FIGS. 5-6 correspond to digital battery chargers 103 in FIGS. 1-2, respectively.

Referring to FIG. 5, a circuit arrangement 220 shows a partial block diagram of a digital battery charger 103. In the embodiment in FIG. 5, some block are omitted for the sake of clarity of presentation, such as charge circuit 115.

Some of the blocks in circuit arrangement 220 are described above, and operate in a similar manner as detailed above. Examples include ADC 106 and IDAC 112.

Referring again to FIG. 5, using reference voltage $V_{ref}$, ADC 106 converts the analog battery voltage, $V_{BAT}$, to digital signal 106A, as described above. Digital signal 106A is subtracted, using subtractor 250, from a desired battery terminal voltage (e.g., at full charge), $V_{FULL}$. The result of the subtraction, digital signal 250A, is fed to an input of integrator 244.

Integrator 244 integrates digital signal 250A, and provides the resulting integrated digital signal 244A to minimum circuit 238. Integrator 244 is used to compensate the negative feedback loop in digital charger 103. Integrator 244 further filters quantization noise from ADC 106. In the embodiment shown, control circuit 247 uses reset signal 247A to reset integrator 244 at various intervals, for example, at the beginning of each integration cycle or period.

Digital signal 106A at the output of ADC 106 is fed to optional filter 253. If used, filter 253 filters digital signal 106A (e.g., to remove noise, such as quantization noise from ADC 106, or variations of relatively high frequency) and provides filtered signal 253A to control circuit 247.

Control circuit 247 (part of digital controller 109, see FIGS. 1-2) uses filtered signal 253A to determine various conditions and to modify the charging process as appropriate. For example, if filtered signal 253A is below a threshold, $V_{pre}$, or above a threshold $V_{overvol}$, control circuit 247 may cause the charging cycle or process or profile or mode to change, for example, by reducing the charge current or by stopping the charge process, etc.

Similarly, integrated digital signal 244A at the output of integrator 244 is fed to optional filter 241. If used, filter 241 filters integrated digital signal 244A (e.g., to remove noise or variations of relatively high frequency) and provides filtered signal 244A to control circuit 247.

Control circuit 247 uses filtered signal 244A to determine various conditions and to modify the charging process as appropriate. For example, if filtered signal 244A is below a threshold, $I_{low}$, indicating that the charge or output current is below a threshold, control circuit 247 may cause the charging cycle to change, for example, for charging to stop and/or for charging to stop and a float charge mode to start, etc.

An ADC 223 receives an analog signal, $I_s$, which represents the current through the supply voltage (e.g., $V_s$, described above) due to devices, circuits, blocks, etc, other than digital battery charger 103. Using reference signal $I_{ref}$, ADC 223 generates digital signal 223A. Digital signal 223A is fed to optional filter 226. If used, filter 226 filters digital signal 226A (e.g., to remove noise, such as quantization noise from ADC 106, or variations of relatively high frequency) and provides filtered signal 226A to subtractor 229.

Subtractor 229 subtracts filtered signal 226A from a signal that denotes the maximum current available, $I_{s, max}$. In some situations, the supply voltage (e.g., $V_s$, described above) may have a limited allowable or available output current. For example, suppose that the supply voltage constitutes a universal serial bus (USB) device or port. The USB port may have a maximum output current capability of 500 mA ($I_{s, max}$). If, in addition to digital battery charger 103 another device is also drawing current, say, 100 mA ($I_s$), from the USB port, then the maximum available current from the USB port for charging a battery would be reduced to (500 mA-100 mA), or 400 mA, in the example above. Using the maximum charge current available allows digital battery charger 103 to adapt to such situations, to accommodate a variety of supply voltages or sources, and to provide additional flexibility in its operation.

Referring again to FIG. 5, the result of the subtraction, digital signal 229A, is provided to minimum circuit 238. Digital signal 229A therefore represents the amount of additional charging current, if any, the supply voltage (e.g., $V_s$, described above) may provide to charge battery 118 (not shown). Thus, digital signal 229A represents the amount of "headroom" in the current available from the supply voltage to use to charge battery 118 (not shown).

Another signal, $I_{BAT, max}$, is also provided to minimum circuit 238. Signal $I_{BAT, max}$ represents the maximum charging current for a given battery. In other words, the charging current for the battery should not exceed $I_{BAT, max}$.

Minimum circuit 238 provides as output signal (minimum signal) 238A the minimum of the signals provided as inputs to minimum circuit 238. Thus, for the example shown, minimum circuit 238 provides the smallest of signals 244A, 229A, and $I_{BAT, max}$ as output signal 238A. Output signal 238A is used to determine the magnitude of charge signal 115A (not shown).

More specifically, output signal 238A feeds an input of IDAC 112. Output signal 238A also feeds an input of delta-sigma modulator 235. Delta-sigma modulator 235 produces a 1-bit output signal 235A, which feeds another input of IDAC 112.

In exemplary embodiments, some of the bits in output signal 238A are provided to delta-sigma modulator 235, and the remaining bits of output signal 238A are provided to IDAC 112. For example, assuming a 16-bit output signal 238A, the four most-significant bits (MSBs) of output signal 238A feed IDAC 112. The remaining 12 least-significant bits (LSBs) of output signal 238A feed delta-sigma modulator 235, which generates 1-bit output signal 235A. By driving the LSBs from 1-bit output signal 235A of delta-sigma modulator 235, the effective resolution of the control loop is increased through over-sampling in delta-sigma modulator 235.

In effect, the four MSBs of output signal 238A and 1-bit output signal 235A together form input signals 112I that feed the inputs of IDAC 112. Thus, in the example described above, overall, IDAC 112 receives a 5-bit digital signal. IDAC 112 converts the 5-bit digital signal to analog output signal 112A. Analog output signal 112A is provided to charge circuit 115 (not shown), as described above. Using the scheme described above allows reducing design complexity of IDAC 112 while achieving relatively high resolution.

In addition to IDAC 112, circuit arrangement 220 includes IDAC 232. Analog output signal 232A (a current signal) of IDAC 232 serves as the reference signal ($I_{ref}$) for IDAC 112. Thus, IDAC 232 and IDAC 112 constitute a multiplying DAC (MDAC).

In exemplary embodiments, system and/or battery parameters (e.g., battery size, type, capacity, etc.) form the digital input signal of IDAC 232. In effect, IDAC 112 receives a reference signal that depends on the system and/or battery parameters. Thus, output signal 112A is depends on or is derived from the system and/or battery parameters. In response, charge circuit 115 (not shown) provides charge signal 115A (not shown) to battery 118 (not shown).

One aspect of the disclosure relates to the loop compensation of digital battery charger 103. More specifically, assume that battery 118 has an impedance $Z_{bat}$, which may be approximated as an internal resistance $R_s$ in the frequency range of interest, and that bypass capacitor 121 has a capacitance $C_b$. The combination of $R_s$ and $C_b$ gives rise to a pole in the frequency response of digital battery charger 103 (or apparatus 121). The loop bandwidth of digital battery charger 103 may be adjusted to be lower than the frequency of the pole due to $R_s$ and $C_b$.

More specifically, assuming that the loop bandwidth is smaller than the corner frequency of IDAC 112, the gain of the control loop of digital battery charger 103 may be expressed as:

$$\text{Gain} = \frac{1}{V_{ref}} \cdot \frac{K \cdot f_s}{s} \cdot \frac{I_r}{2^N} \cdot Z_{bat}.$$

Approximating $Z_{bat}$ with $R_s$, as discussed above, the gain may be expressed as:

$$\text{Gain} \approx \frac{1}{V_{ref}} \cdot \frac{K \cdot f_s}{s} \frac{I_r}{2^N} \cdot R_s,$$

where $V_{ref}$, K, $f_s$, $I_r$, and N represent the reference voltage of ADC 106, the gain of integrator 244, the clock frequency of integrator 244, the full scale current of IDAC 112, and the number of bits of resolution of IDAC 112, respectively.

The loop bandwidth may be adjusted, varied, or programmed by changing one or more of the parameters or variables in the equations above. Generally speaking, the user of digital battery charger 103 has little or no control over the series resistance of battery 118. Similarly, the clock frequency of integrator 244, $f_s$, and the IDAC resolution, N, are usually fixed (although in some embodiments, one or both might be made adjustable, programmable, or variable, as desired).

The user (or some other circuit, controller, subsystem, or system within or external to apparatus 121), however, may adjust, program, or vary either or both K and $I_r$. By doing so, the user (or other circuit, etc., as described above) can adjust, vary, or program the loop bandwidth of digital battery charger 103, given other variables, such as $R_s$. Thus, digital battery charger 103 provides a flexible scheme for controlling the loop bandwidth in order to accommodate various situations, types of battery, etc.

In exemplary embodiments, some guidelines may be used to set the loop bandwidth of digital battery charger 103. Generally, the loop bandwidth of digital battery charger 103 should be higher than a minimum that allows reliable operation of protection circuitry. For example, battery 118 may include protection circuitry with a given detection window, say, 1 second. If the loop bandwidth of digital battery charger 103 is too low, a condition (e.g., too high a charge current) can trigger such protection circuitry before digital battery charger 103 takes corrective measures to remedy the condition.

Conversely, the loop bandwidth of digital battery charger 103 should not be too high so as to allow digital battery charger 103 to respond to spurious (e.g., noise) signals. Furthermore, having a relatively high loop bandwidth of digital battery charger 103 might generate relatively large charge voltage and charge current (as provided by charge circuit 115).

FIG. 6 depicts a circuit arrangement 270 for control and signal processing in a digital battery charger 103 according to another exemplary embodiment. As noted above, generally, the embodiment in FIG. 6 corresponds to digital battery charger 103 in FIG. 2. Thus, as noted above in connection with FIG. 2, circuit arrangement 270 includes circuitry that adds current feedback to the control loop of digital battery charger 103.

Specifically, as noted above, current signal 136A, which is derived from or represents the current (typically, charge current 115A (not shown)) flowing through battery 118 (not shown), is used as part of the control negative feedback loop. Current signal 136A is provided as an input to ADC 273, which converts current signal 136A to digital signal 273A. Digital signal 273A forms one input of adder 250, which adds to digital signal 273 output signal 238A of minimum circuit 28.

Filter 285, optionally used, filters digital signal 273A, to generate filtered signal 285A. Filtered signal 285A is provided to control circuit 247. Control circuit 247 uses filtered signal 285A to determine various conditions and to modify the charging process as appropriate. For example, if filtered signal 285A is below a threshold value, control circuit 247 may cause the value of the charge current (e.g., charge signal 115A in FIGS. 1-2) to change, for instance, to increase, and vice-versa.

Referring again to FIG. 6, using subtractor 276, digital signal 106A is subtracted from $V_{FULL}$, to generate an error signal, as described above with respect to FIG. 5. The output of subtractor 276, i.e., signal 276A, is provided to divider 279. Divider 279 divides signal 276A by $R_s$ to generate and provide a current limit signal, i.e., output signal 279A, to minimum circuit 238. The rest of circuit arrangement 270 operates in a similar way to circuit arrangement 220 in FIG. 5.

As noted in connection with the exemplary embodiments described above, digital battery chargers according to the disclosure can provide a variety of flexible charging processes or profiles. The negative feedback loop (e.g., including ADC 106, ADC 273, integrator 244, etc.) continuously monitors the terminal voltage of battery 118 and charge signal (e.g., current) 115A. This scheme provides for more sophisticated charging processes or profiles. It also allows an estimation of the state of charge of battery 118, which may be used in determining whether to continue using a battery charging process, whether to modify the process, etc.

In addition, battery and/or battery charger protection may be provided, as desired. Battery terminal voltage and/or charge current safety protection and mode detection use circuitry with relatively limited response speeds, as for example, implemented with filters 253 and 285, and control circuit 247.

In exemplary embodiments, IDAC 112 and IDAC 232 may be implemented in a variety of ways. For example, in some embodiments, one or both of IDAC 112 and IDAC 232 may be realized as a current DAC. As another example, in some embodiments, one or both of IDAC 112 and IDAC 232 may be realized as an output mirror ratio circuit (producing a mirror current with a given ratio that depends on the digital input signal of the IDAC). As another example, in some embodiments, one or both of IDAC 112 and IDAC 232 may be realized as a combination of a current DAC and an output mirror ratio circuit. Other implementations are possible and are contemplated in other embodiments, as desired.

Figure 7:
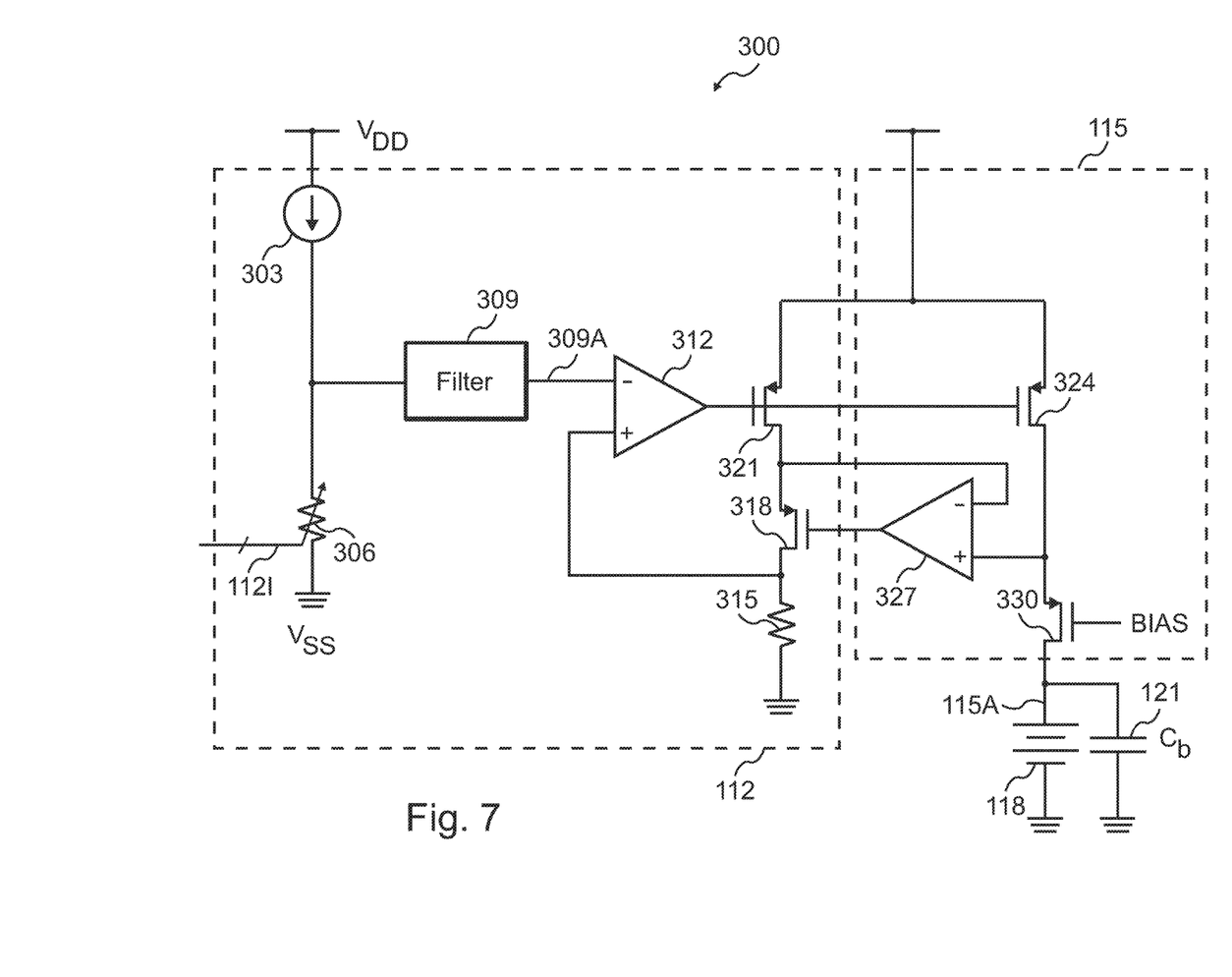
FIG. 7 illustrates a circuit arrangement for a current digital-to-analog converter (IDAC) and a charge circuit according to an exemplary embodiment.

FIG. 7 illustrates a circuit arrangement 300 for an IDAC 112 and charge circuit 115 according to an exemplary embodiment. IDAC 112 receives input signals 1121 via variable resistor 306. More specifically, the resistance of variable resistor 306 varies as the function of digital input signals 1121.

A current source 303 provides a current to variable resistor 306. Variable resistor 306 is coupled between the output of current source 303 and circuit ground. As a result of the current provided by current source 303, a voltage across variable resistor 306 develops that is proportional to the resistance of variable resistor 306, which in turn depends on the digital input signals 1121.

A filter 309 filters the voltage across variable resistor 306 to generate filtered signal 309A. Generally, filter 309 gives rise to the corner frequency in the frequency response of IDAC 112. Filtered signal 309A drives one input of amplifier 312. A resistor 315, coupled to transistor 318, is coupled to another input of amplifier 312. Through transistor 321, transistor 318, and resistor 315, a feedback network is formed around amplifier 312. Thus, amplifier 312 causes a voltage to develop across resistor 315 which is the same or nearly the same as filtered signal 309 (generally, the voltage across variable resistor 306).

The output of amplifier 312 drives a current mirror that includes transistors 321 and 324, which constitute MOSFETs in the embodiment shown. A node at the drain of transistor 321 and the source of transistor 318 drives an input of amplifier 327. The drain of transistor 324 drives another input of amplifier 327. The output of amplifier 327 drives the gate of transistor 318.

As noted above, transistor 321 and transistor 324 form a current mirror. By virtue of negative feedback, amplifier 327 drives the gate of transistor 318 such that the voltages at the respective drains of transistors 321 and 324 are the same or nearly the same, which improves current matching.

The current flowing through transistor 324 constitutes the charge current or, generally, charge signal 115A. In some embodiments, a cascode configuration is used, which includes transistor 330. The gate of transistor 330 is biased appropriately for the cascode operation. Using transistor 330 allows digital battery charger 103 to accommodate higher supply and/or battery terminal voltages than would using transistor 324 alone (i.e., without using a cascade configuration).

If the width to length (W/L) ratios of transistor 321 and transistor 324 are the same, then transistor 321 and transistor 324 conduct the same (or nearly same) current. Using different width to length ratios for transistor 321 and transistor 324, however, allows scaling charge signal 115 to a desired multiple of the current flowing through transistor 321.

More specifically, transistor 321 may be made smaller so as to reduce use of IC area and to reduce power consumption. Transistor 324 may be made larger to accommodate the desired charge current (signal 115A). By virtue of the size differences (e.g., different W/L ratios), a desired ratio of the currents conducted by transistors 321 and 324 may implemented or maintained. The various ratios of current may be used to accommodate various types, sizes, and/or capacities of battery 118.

In some embodiments, transistor 324 (and transistor 321, as desired) may be implemented as a plurality of MOSFETs coupled in parallel. The MOSFETs coupled in parallel may have the same or different sizes (e.g., W/L ratios) as transistor 321. By turning on one or more of the MOSFETs (e.g., by digital controller 109 (not shown)), the effective size (W/L ratio) of transistor 324 may be varied. As a result, a desired ratio of the currents conducted by transistors 321 and 324 may implemented or maintained.

Figure 8:
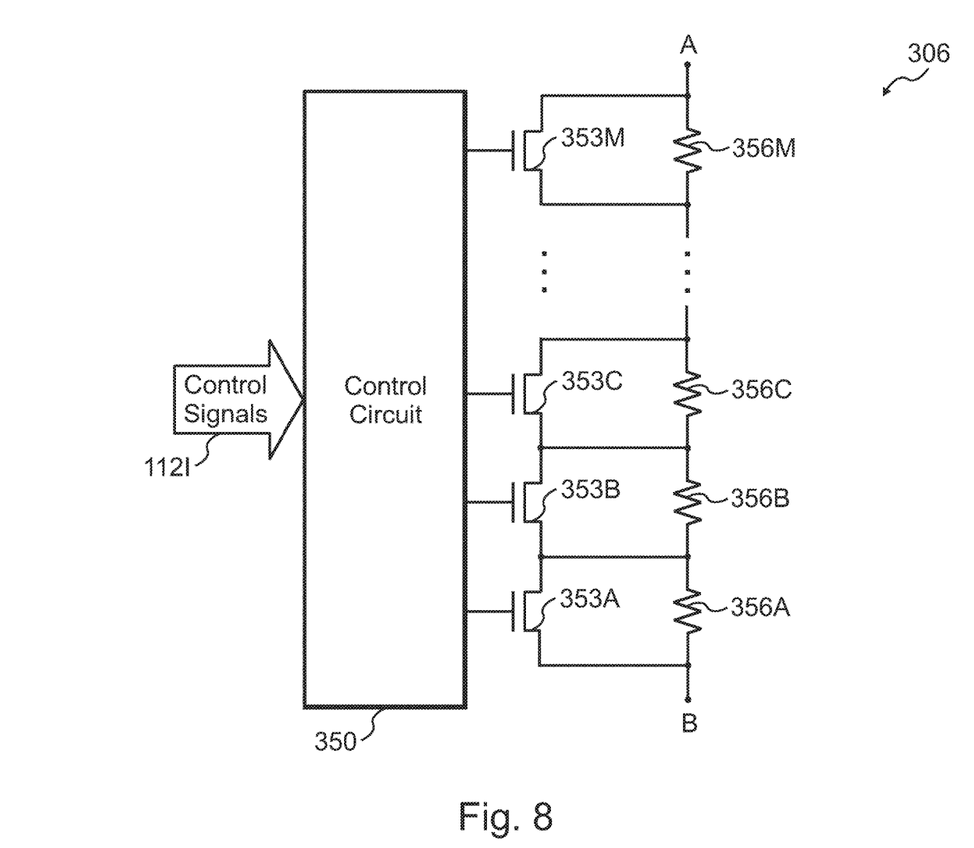
FIG. 8 shows a circuit arrangement for a digitally controlled variable resistor for use in an IDAC according to an exemplary embodiment.

Variable resistor 306 may be implemented in a variety of ways. FIG. 8 shows a circuit arrangement for an example implementation of digitally controlled variable resistor 306. Input signals 1121 (of IDAC 112) serve as control signals that vary the resistance of variable resistor 306. Input signals 1121 drive inputs of control circuit 350. Control circuit 350 decodes input signals 1121 to drive a plurality of transistors 353A-353M. In other words, in response to input signals 1121, control circuit 350 turns on some (or none) of transistors 353A-353M.

Transistors 353A-353M are coupled across a set of cascade coupled resistors 356A-356M. The overall resistance of variable resistor 306A develops across points A and B, i.e., the two ends of the set of cascade coupled resistors 356A-356M.

When one of transistors 353A-353M is turned on, it forms a conduction path around the corresponding resistor in the set of resistors 356A-356M (effectively shorting that resistor). Thus, by turning on various transistors in the plurality of transistors 353A-353M in response to the bits in input signals 1121, the overall resistance of variable resistor 306A is varied.

As noted above, in some embodiments, more than one IDAC may be used. For example, the embodiments shown in FIGS. 5-6 use IDAC 232 in addition to IDAC 112. As persons of ordinary skill in the art will understand, IDAC 232 may be implemented in a similar manner as IDAC 112, as described above.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a digital battery charger, comprising:
a first analog-to-digital converter (ADC) to convert a terminal voltage of a battery to a first digital signal;
a digital controller comprising an integrator coupled to the first ADC, the digital controller to receive the first digital signal and provide a set of control signals; and
a first current digital-to-analog converter (IDAC) coupled to the digital controller to receive the set of control signals and to provide a battery charging current signal.

2. The apparatus according to claim 1, further comprising a charge circuit coupled to the first IDAC to receive the battery charging current signal and to provide a charging current.

3. The apparatus according to claim 2, further comprising a battery coupled to receive the charging current from the charge circuit.

4. The apparatus according to claim 1, wherein the digital battery charger further comprises a second IDAC coupled to the first IDAC, wherein the second IDAC provides a reference signal to the first IDAC.

5. The apparatus according to claim 4, wherein the second IDAC provides the reference signal to the first IDAC based on battery parameters.

6. The apparatus according to claim 1, wherein the first IDAC comprises a variable resistor, wherein a resistance of the variable resistor varies in response to the set of control signals provided by the digital controller.

7. The apparatus according to claim 1, wherein the first IDAC further comprises a current mirror coupled to the variable resistor.

8. The apparatus according to claim 1, wherein the digital controller comprises a minimum circuit coupled to the integrator, wherein an output signal of the minimum circuit is coupled to the first IDAC.

9. The apparatus according to claim 8, wherein the digital battery charger further comprises a second ADC to convert a current flowing through the battery to a second digital signal; and wherein the digital controller uses the second digital signal in a negative feedback loop to provide the battery charging current signal.

10. An apparatus, comprising:
a digital battery charger, comprising
  a first analog-to-digital converter (ADC) to convert a terminal voltage of a battery to a first digital signal;
  a second ADC to convert a supply current signal to a second digital signal;
  a digital controller coupled in a feedback loop to receive the first and second digital signals and provide a set of control signals;
  a first current digital-to-analog converter (IDAC) coupled to the digital controller to receive the set of control signals and to provide a battery charging current signal;
  a second IDAC to convert battery parameters to a reference signal provided to the first IDAC.

11. The apparatus according to claim 10, further comprising a charge circuit coupled to the first IDAC to receive the battery charging current signal and to provide a charging current.

12. The apparatus according to claim 11, further comprising a battery coupled to receive the charging current from the charge circuit.

13. The apparatus according to claim 10, wherein the digital controller comprises:
  a subtractor to subtract the first digital signal from a third digital signal and to provide a different signal;
  an integrator to receive the difference signal and to integrate the difference signal to generate a fourth digital signal; and
  a minimum circuit to receive the fourth digital signal, a fifth digital signal, and a sixth digital signal, and to provide the set of control signals to the first IDAC.

14. The apparatus according to claim 13, wherein the fifth digital signal is derived from the second digital signal, and the sixth digital signal represents a maximum battery charging current.

15. A method of charging a battery using a battery charger employing a digital control loop, the method comprising:
  converting, by using a first analog-to-digital converter (ADC), a terminal voltage of a battery to a first digital signal;
  generating, using a digital controller, comprising an integrator, and coupled to receive the first digital signal, a set of control signals; and
  receiving the set of control signals in a first current digital-to-analog converter (IDAC); and
  generating, using the first IDAC, a battery charging current signal.

16. The method according to claim 15, further comprising using a charge circuit to receive the battery charging current signal and to provide a charging current.

17. The method according to claim 15, further comprising:
  receiving in a second IDAC a set of battery parameters; and
  generating, using the second IDAC, a reference signal for the first IDAC.

18. The method according to claim 15, wherein generating, using the first IDAC, the battery charging current signal further comprises varying a resistance of a variable resistor in response to the set of control signals.

19. The method according to claim 18, wherein generating, using the first IDAC, the battery charging current signal further comprises using a current mirror to generate the battery charging current signal.

20. The method according to claim 18, wherein the battery charging current signal is generated with a specified ratio to a current that is derived from a voltage across the variable resistor.

* * * * *